United States Patent [19]

Becker

[11] Patent Number: 4,907,620

[45] Date of Patent: Mar. 13, 1990

[54] PROPORTIONER PUMPING SYSTEM

[75] Inventor: Richard W. Becker, Casper, Wyo.

[73] Assignee: Becker Enterprises, Casper, Wyo.

[21] Appl. No.: 243,814

[22] Filed: Sep. 13, 1988

[51] Int. Cl.[4] .............................................. F16K 19/00

[52] U.S. Cl. .................................... 137/893; 137/565; 137/898; 239/124

[58] Field of Search ............... 137/238, 563, 565, 893, 137/897, 898; 239/124

[56] References Cited

U.S. PATENT DOCUMENTS 3,075,749 1/1963 Mason ............................. 239/124 X 3,806,037 4/1974 Loewenkamp ................. 239/124 X 4,645,009 2/1987 Hawelka ......................... 137/893 X

*Primary Examiner*—Robert G. Nilson

*Attorney, Agent, or Firm*—Dean P. Edmundson

[57] ABSTRACT

A pumping system is described for pumping a first fluid (e.g., water) and selectively adding a second fluid (e.g., fire retardant chemical, fertilizer, pesticide, etc.) to the first fluid. The system includes a pump connected to a discharge manifold having discharge openings. An inlet conduit is connected between the pump and the first fluid. An eductor conduit is connected between the discharge manifold and the inlet conduit. A feed conduit feeds the second fluid to the eductor. A control valve selectively allows the second fluid to be fed to the first fluid. When the second fluid is not being added, the feed line is flushed without changing pressure.

17 Claims, 2 Drawing Sheets

PROPORTIONER PUMPING SYSTEM

FIELD OF THE INVENTION

This invention relates to pumping systems. More particularly, this invention relates to proportioner pumping systems. Even more particularly, this invention relates to pumping systems including proportioners for adding one fluid component to another fluid component.

BACKGROUND OF THE INVENTION

Pumping systems are used in many application and in many industries to move fluids from one location to another. Often it is necessary to add one or more special fluids to a base fluid which is being pumped. For example, in fire-fighting equipment it is often necessary and desirable to add a fire retardant chemical to a water stream which is being used to subdue a fire. There are many types of fire retardant chemicals used for this purpose. Typically they create a fire retardant foam when mixed with water and forced through a discharge nozzle.

Typically, conventional pumping equipment used for adding a fire-retardant chemical to the water involves the use of three individual valves. One valve controls water flow, another valve controls chemical addition, and yet another valve controls flushing of the chemical supply line. The use of this plurality of valves leaves much room for operator error. Also, it requires separate operation of the valves at the necessary times in order to obtain the desired addition of chemical to the water. This may not be convenient, particularly where time is of the essence. Further, after the chemical has been added to the water it is necessary to operate the valves in such a manner that the chemical supply line can be properly flushed. Operation of valves also results in changes in the water pressure at the discharge nozzle. This is undesirable.

There has not heretofore been provided a simple and efficient pumping system for adding a controlled amount of a fluid to another fluid while maintaining constant nozzle pressure as described herein.

SUMMARY OF THE PRESENT INVENTION

In accordance with the present invention there is provided a unique pumping system for pumping a first fluid (e.g., water) and selectively and controllably adding a second fluid (e.g., fire retardant chemical, fertilizer, pesticide, etc.) to the first fluid.

In one embodiment the pumping system of the invention comprises:

(a) a source of first fluid;
(b) a source of second fluid;
(c) a pump having inlet and outlet ports;
(d) an inlet conduit communicating between the first fluid and the inlet port of the pump;
(e) a discharge manifold including an inlet opening and at least one discharge opening;
(f) an eductor conduit having first and second ends; wherein the first end is operatively connected to the discharge manifold and the second end is operatively connected to the inlet conduit;
(g) a feed conduit connected between the source of second fluid and the eductor conduit;
(h) a control valve contained in the feed conduit;
(i) a flush conduit connected between the discharge manifold and the control valve.

The control valve is movable between a first position in which the second source of fluid is operatively connected to the feed conduit and a second position in which the flush conduit is operatively connected to the feed conduit. When the control valve is in its first position the second fluid is drawn through the feed conduit and into the pump as the first fluid moves through the pump. When the control valve is in its second position a portion of the first fluid moves through the flush line and into the feed conduit.

In the pumping system of this invention the pressure of the fluid being discharged through the discharge manifold does not change when the second fluid is added or when the flow of the second fluid is stopped. In other words, the pumping system maintains constant exit nozzle pressure without adjustment of the pump speed or the discharge valve setting.

The pumping system of the invention effectively controls the addition of a second fluid to the first fluid in a manner such that operator error is minimized. Only one control valve need be operated in order to control addition of the second fluid to the first fluid.

Also, the system of the invention automatically flushes the second fluid from the lines when the control valve is closed to the second fluid. No separate flushing or disassembly of the system is required.

In a preferred embodiment there are several discharge openings in the discharge manifold and a hose or other exit line is attached to each discharge opening. A separate valve controls flow through each hose. It is also preferable for the eductor conduit to include a venturi to assist in drawing the second fluid into the eductor conduit when the control valve is opened.

Other advantages of the system of this invention will become apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
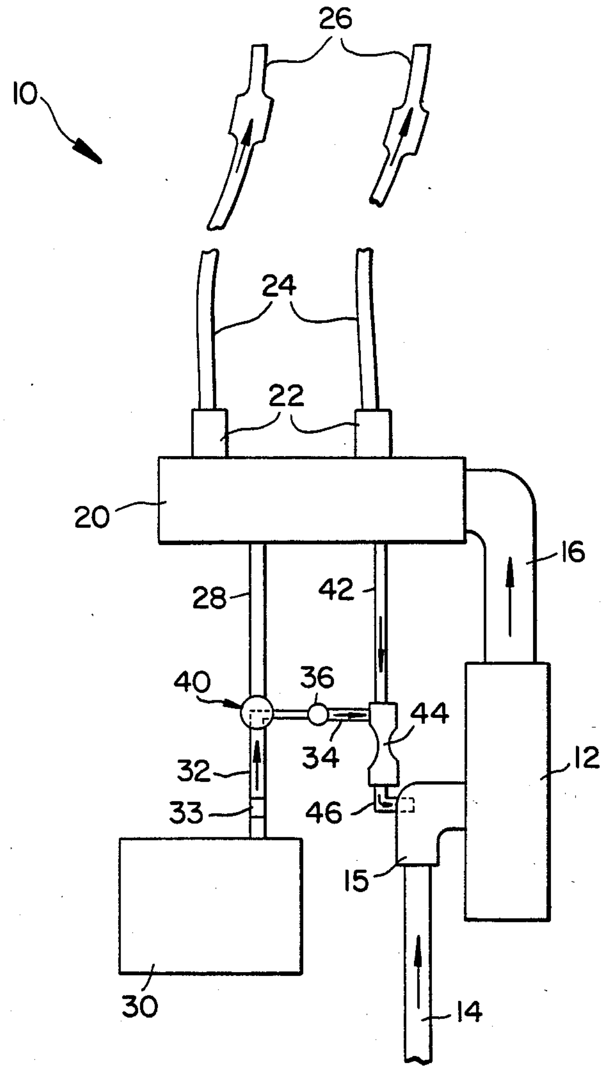
FIG. 1 is a schematic of one embodiment of pumping system of the invention with a control valve set for adding a chemical to another fluid being pumped.

In the drawings there is shown a preferred embodiment of pumping system 10 of the invention. As shown in FIG. 1 a pump 12 is adapted to draw fluid (e.g., water) in through inlet conduit 15 and supply line 14 and then push it through conduit 16 to discharge manifold 20.

The discharge manifold 20 preferably includes a plurality of discharge openings. Preferably flow of fluid through each discharge opening may be adjusted and controlled by means of a valve 22. Operably connected to each discharge opening is a flexible hose 24 which includes a nozzle 26 on its outer end, as illustrated.

A chemical to be selectively added to the water being pumped may be contained in a supply tank 30. A feed conduit 32, including a check valve 33, leads from the tank 30 to control valve 40, as shown. Another feed conduit 34 extends between valve 40 and venturi eductor 44. Conduit 34 preferably includes a metering valve 36 to meter the rate at which the chemical can be added to the water being fed into conduit 15.

Eductor conduit 42 is connected between the discharge manifold and the eductor 44. Conduit 46 leads from the exit end of the eductor to the pump inlet conduit 15.

Flush line 28 is connected between the discharge manifold 20 and the control valve 40. Water enters the flush line through the manifold.

The control valve 40 is movable between two positions. When valve 40 is in one position (as shown in FIG. 1) the conduit 32 communicates with conduit 34 so that chemical can be drawn out of tank 30 and fed into inlet conduit 15 of pump 12. The flush line is closed off. Water passing through eductor conduit 42, venturi 44, and conduit 46 draws the chemical through feed conduits 34 and 32 so that the chemical is added to and mixed with the water, as illustrated.

Figure 2:
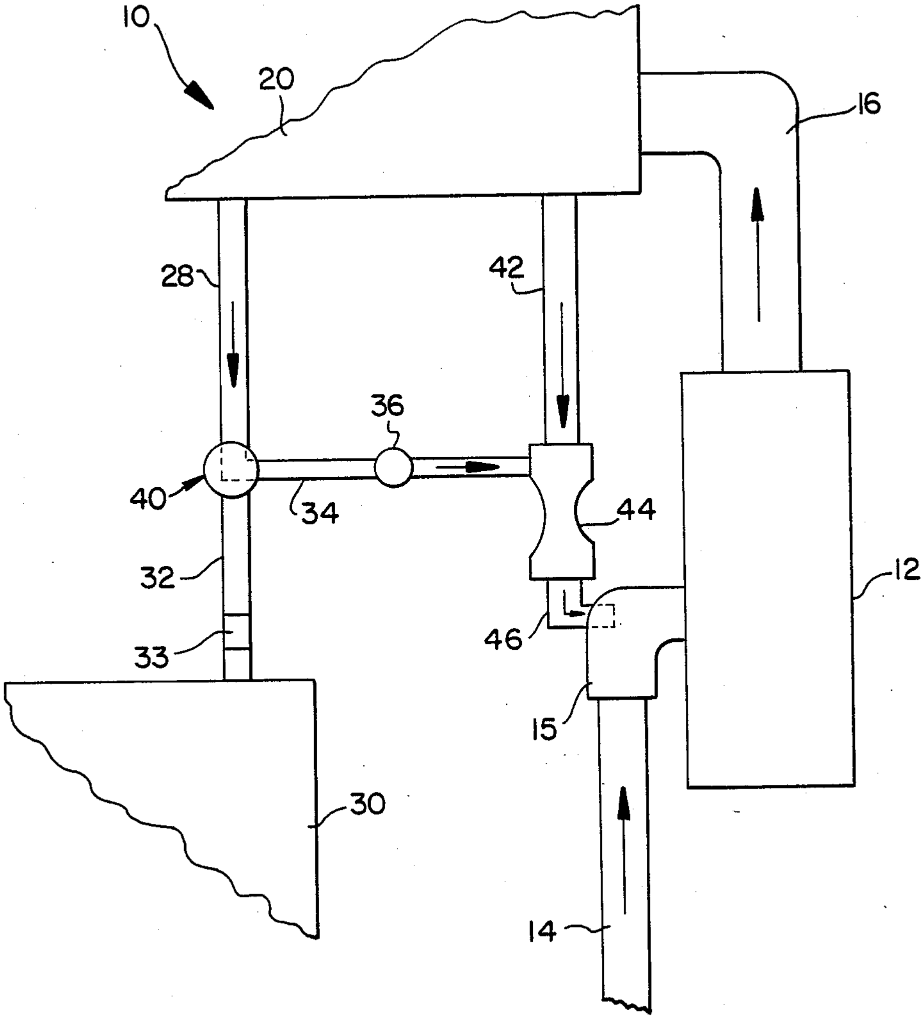
FIG. 2 is a fragmentary schematic of the embodiment of the pumping system shown in FIG. 1 with the control valve set for flushing the chemical supply line while pumping the main fluid.

When the control valve 40 is moved to its other position (shown in FIG. 2) the conduit 32 is closed off so that chemical cannot pass from tank 30 to pump 12. Instead, valve 40 allows a small amount of fluid being pumped to pass out of the discharge manifold 20 into flush line 28 and then into conduit 34. This flushes all chemical out of the feed conduit 34.

In the pumping system illustrated in the drawings, there is no change in operating pressure when the control valve 40 is moved from one position to another. In other words, a constant nozzle pressure is maintained when switching from chemical add position to a no-add position. This is very advantageous and avoids the need to manipulate other valves to keep the desired discharge pressure. As a result, the pumping system of the invention is much simpler and more efficient than prior systems. It also eliminates or minimizes operator error because there is only one valve to operate to initiate or terminate chemical addition.

Another major advantage of the pumping system of the invention is that the chemical supply line is automatically flushed when the addition of chemical is stopped. Still another advantage of this system is that the suction side of the pump is jetted with discharge pressure, as illustrated, to increase pump performance since the water jet pushes the suction water into the pump.

In the drawings the arrows indicate the direction of flow of the fluid such as water. The source of the water or other fluid may be a tank, hydrant, lake, pond, or another pump.

Other variants are possible without departing from the scope of this invention. For example, any size pump may be used. The pump may be powered electrically, hydraulically, mechanically, etc. The number and size of the discharge openings in the manifold may also vary. Although FIG. 1 herein illustrates the use of flexible hoses connected to the discharge openings, other arrangements could also be used.

The pumping system may be used in various industries (e.g., fire fighting equipment; agricultural applications; industrial applications; etc.). Although the drawings illustrate the use of a single tank or source for chemical additive, the system of this invention is also useful when there are a plurality of chemical additives in separate tanks. In such cases a separate feed conduit extends from each tank to the inlet conduit for the pump, and a separate control valve 40 may be used in each feed conduit. Then any one or more of the chemicals may be added to the main fluid in the pump, as desired.

Other variants of this system may also be made. For example, the system may be produced and sold without the pump included so that the customer may select any pump which may be necessary or desired for a particular application. Then the pump can be connected to the system in the manner illustrated herein.

What is claimed is:

1. A pumping system for pumping a first fluid and selectively adding a second fluid to said first fluid, said pumping system comprising:

(a) a source of said first fluid;
(b) a source of said second fluid;
(c) a pump having inlet and outlet ports;
(d) an inlet conduit communicating between said source of first fluid and said inlet port of said pump;
(e) a discharge manifold including an inlet opening and at least one discharge opening;
(f) an eductor conduit having first and second ends; wherein said first end is operatively connected to said discharge manifold and said second end is operatively connected to said inlet conduit;
(g) a feed conduit connected between said source of second fluid and said eductor conduit;
(h) a control valve contained in said feed conduit;
(i) a flush conduit connected between said discharge manifold and said control valve;

wherein said control valve is movable between a first position in which said second source of fluid is operatively connected to said feed conduit and a second position in which said flush conduit is operatively connected to said feed conduit; wherein when said control valve is in said first position said second fluid is drawn through said feed conduit and into said pump as said first fluid moves through said pump, and when said control valve is in said second position a portion of said first fluid moves through said flush line and into said feed conduit.

2. A pumping system in accordance with claim 1, wherein there are a plurality of discharge openings in said manifold, and further comprising a discharge valve to control flow through each said opening.

3. A pumping system in accordance with claim 1, wherein said eductor conduit includes a venturi.

4. A pumping system in accordance with claim 1, further comprising a metering valve operatively positioned in said feed conduit.

5. A pumping system in accordance with claim 1, further comprising a check valve in said feed conduit near said second source of fluid.

6. A pumping system in accordance with claim 1, wherein said first fluid comprises water.

7. A pumping system in accordance with claim 6, wherein said second fluid comprises fire retardant chemical.

8. A pumping system in accordance with claim 6, wherein said second fluid comprises pesticide.

9. A pumping system in accordance with claim 6, wherein said second fluid comprises fertilizer.

10. A pumping system for pumping a first fluid and selectively adding a second fluid to said first fluid, said pumping system comprising:

(a) a source of said first fluid;
(b) a source of said second fluid;
(c) a pump having inlet and outlet ports;

(d) an inlet conduit communicating between said source of first fluid and said inlet port of said pump; said inlet conduit including a venturi;

(e) a discharge manifold including an inlet opening and a plurality of discharge openings; wherein each said discharge opening includes a discharge valve for controlling flow therethrough;

(f) an eductor conduit having first and second ends; wherein said first end is operatively connected to said discharge manifold and said second end is operatively connected to said inlet conduit;

(g) a feed conduit connected between said source of second fluid and said eductor conduit;

(h) a control valve contained in said feed conduit;

(i) a flush conduit connected between said discharge manifold and said control valve;

wherein said control valve is movable between a first position in which said second source of fluid is operatively connected to said feed conduit and a second position in which said flush conduit is operatively connected to said feed conduit; wherein when said control valve is in said first position said second fluid is drawn through said feed conduit and into said pump as said first fluid moves through said pump, and when said control valve is in said second position a portion of said first fluid moves through said flush line and into said feed conduit.

11. A pumping system in accordance with claim 10, further comprising a metering valve operatively positioned in said feed conduit.

12. A pumping system in accordance with claim 10, further comprising a check valve in said feed conduit near said second source of fluid.

13. A pumping system in accordance with claim 10, wherein said first fluid comprises water.

14. A pumping system in accordance with claim 13, wherein said second fluid comprises fire retardant chemical.

15. A pumping system in accordance with claim 13, wherein said second fluid comprises pesticide.

16. A pumping system in accordance with claim 13, wherein said second fluid comprises fertilizer.

17. A proportioner system for connection to a pump of the type including an inlet port and an outlet port, said system being adapted to selectively add a second fluid to a first fluid being pumped by said pump, said system comprising:

(a) a discharge manifold including an inlet opening and at least one discharge opening;

(b) an inlet conduit for communicating between a source of said first fluid and said inlet port of said pump;

(c) an eductor conduit having first and second ends; wherein said first end is operatively connected to said discharge manifold and said second end is operatively connected to said inlet conduit;

(d) a feed conduit connected between a source of said second fluid and said eductor conduit;

(e) a control valve contained in said feed conduit;

(f) a flush conduit connected between said discharge manifold and said control valve;

wherein said control valve is movable between a first position in which said second source of fluid is operatively connected to said feed conduit and a second position in which said flush conduit is operatively connected to said feed conduit; wherein when said control valve is in said first position said second fluid is drawn through said feed conduit and into said pump as said first fluid moves through said pump, and when said control valve is in said second position a portion of said first fluid moves through said flush line and into said feed conduit.

* * * * *